UNITED STATES PATENT OFFICE.

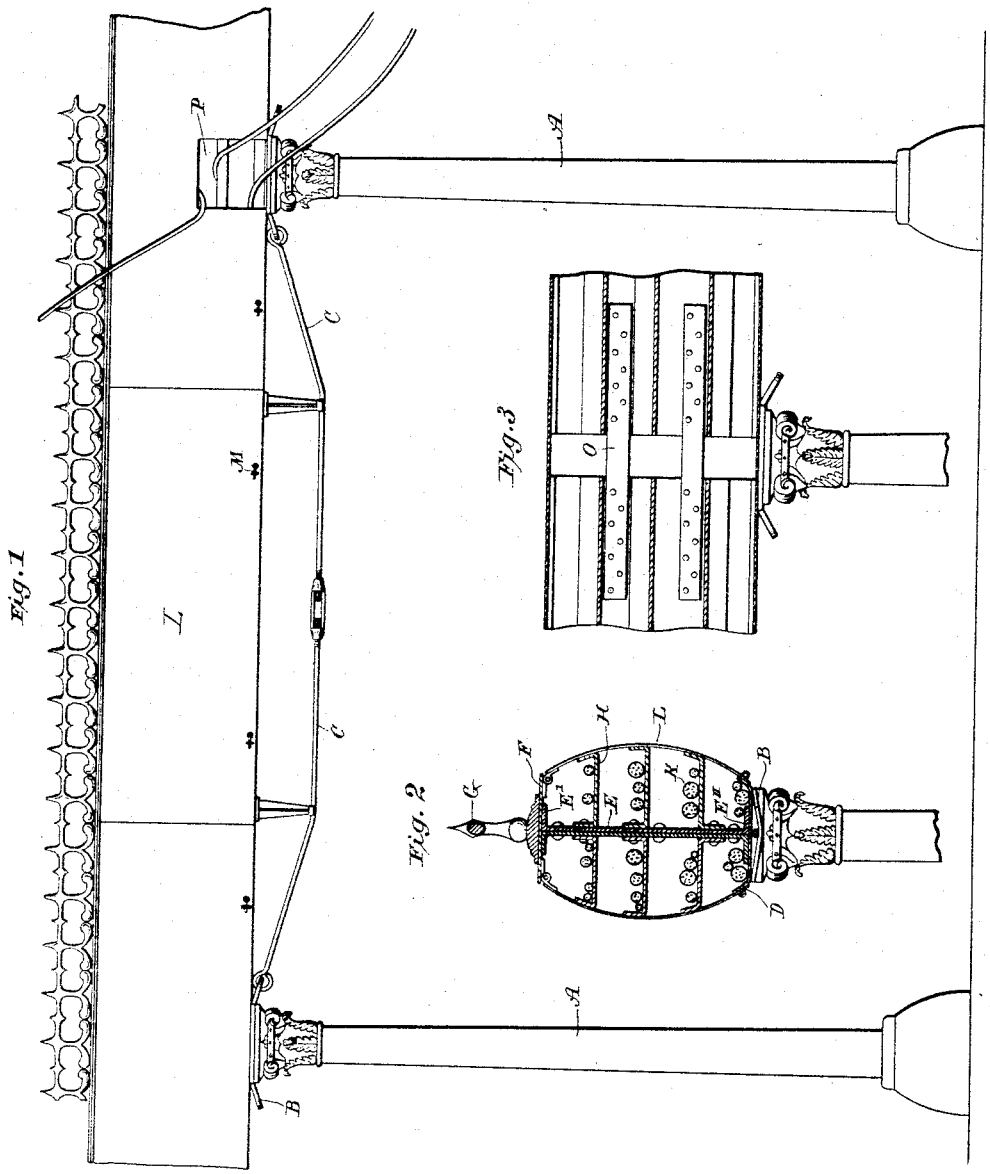

ADOLPHUS A. KNUDSON, OF BROOKLYN, NEW YORK.

AERIAL CONDUIT FOR ELECTRIC CONDUCTORS.

SPECIFICATION forming part of Letters Patent No. 438,003, dated October 7, 1890.

Application filed August 16, 1890. Serial No. 362,192. (No model.)

*To all whom it may concern:*

Be it known that I, ADOLPHUS A. KNUDSON, a citizen of the United States, residing at Brooklyn, in the county of Kings and State of New York, have invented certain new and useful Improvements in Aerial Conduits for Electric Conductors, of which the following is a specification, reference being had to the drawings accompanying and forming a part of the same.

This invention is an improvement in aerial conduits for electrical conductors. It has been heretofore proposed to construct these conduits by erecting at comparatively short intervals a series of columns or posts and supporting them on a conduit or longitudinal chamber for insulated wires, one way of making such conduit being to lay along the tops of the columns horizontally double T-shaped beams or girders having shelves or supports for the electric conductors attached to the web of the same, and to employ movable shutters to inclose the space between the edges of the top and bottom flanges of said girder.

My present invention, which is an improvement on this particular form of conduit, consists in the combination, with a line of columns or posts, of horizontal beams or girders having flanges along their edges on one side only and laid together in pairs with their flat sides or faces contiguous. Shelves or supports of suitable character for containing or supporting the conductors are bolted to the web of the girders, the same bolts being employed to bind the girders together. Over each post or over certain ones only the ends of these compound girders are separated by a given space, and are secured together by plates of iron bolted to contiguous ends of the two girders between the shelves or supports for the conductors. At such points openings are made in the hinged or movable flaps or covers which inclose the space between the upper and lower flanges, through which any of the wires may be led out or any desired connection made.

The invention, which consists in details of construction, may be better understood by reference to the accompanying drawings.

Figure 1 is a view in side elevation of a portion of my improved conduit. Fig. 2 is a vertical section of the conduit or longitudinal holder. Fig. 3 is a longitudinal vertical section of a portion of the same.

Pillars or columns A A, on proper foundations and at comparatively short distances apart, are erected along the curb-line or elsewhere in a street. The specific means of mounting or supporting on these the conduit proper may be varied; but I prefer to use the metal cap-plates B B, formed or provided with means of attachment for take-up bars C C, to form trusses to support long spans of conduit.

On the plates B are secured the plates D, with turned-up or flanged edges, and which form the bottom of the conduit. Above these rest the flanged plates or bars E, similar in general configuration to what are known as "trough-beams." Two of these beams are used for each span, their flat sides or webs being held together by rivets or bolts. These form the girders or main supports for the conduits. Over the upper edges or flanges of these beams sheet-iron or other plates F are secured, and the whole may be surmounted by any desired ornamental top G.

Shelves for the reception of the wires are formed by the bent or flanged metal plates H, which are riveted or bolted to the webs of the beams E, and the rivets or bolts used for this purpose may also serve to secure the beams together.

The shelves or chambers for the conductors K are inclosed by means of sheet-iron or other covers L, hinged to the plates F or to the upper flanges E' of the beams E, and provided with suitable fastenings M for locking them to the plates B or the lower flanges E''.

Over each pillar, or over as many as may be desired, the ends of the girders are separated by a small space and held together by straps or bars O, secured to the webs of the said girders between the shelves by means of rivets. At each such break in the continuity of the conduit an opening P is provided in the cover L, through which one or more conductors may be led out to any desired point. These openings may be so small as not to require special means for closing them.

The insulated wires or cables K are laid on the shelves, as shown in Fig. 2, and on the bottom plates B. The flanges on the outer edges of the shelves prevent the conductors from displacement and the covers L protect them from exposure. By this means a large number of wires, all of which are readily accessible along the entire stretch of the conduit, are brought together in small compass in a neat and ornamental structure.

The advantages of this structure are that the compound girders may be made up of much thinner iron than single ones and may have a much wider web, so that a conduit of given capacity may be constructed much lighter and at smaller cost. The flanged shelves, furthermore, when applied in lengths equal or substantially equal to the length of the girder proper form strengthening ribs or flanges, which add materially to the stability and strength of the structure.

What I claim is—

1. The combination, with a line of columns or vertical supports, of a conduit for electric conductors supported thereby and consisting of horizontal beams or girders bolted together in pairs to form the spans, and provided with flanges projecting from their upper and lower edges, as set forth.

2. The combination, with vertical columns or supports and flanged horizontal girders secured together in pairs by bolts passing through their webs, of shelves or supports for electric conductors secured to the webs of the girders by the said bolts, as herein set forth.

3. The combination, with the vertical columns and the flanged horizontal girders bolted together in pairs and provided with shelves or supports between their flanges to receive electric conductors, of connecting plates or bars attached to the ends of the webs of contiguous girders, and covers inclosing the spaces between the flanges of the girders and provided with openings, as and for the purpose set forth.

ADOLPHUS A. KNUDSON.

Witnesses:
ROBT. F. GAYLORD,
PARKER W. PAGE.